United States Patent [19]
Sutton

[11] Patent Number: 5,779,151
[45] Date of Patent: Jul. 14, 1998

[54] STEPPED NOZZLE

[75] Inventor: George P. Sutton, Danville, Calif.

[73] Assignee: Regents of the University of California, Oakland, Calif.

[21] Appl. No.: 654,478

[22] Filed: May 28, 1996

[51] Int. Cl.⁶ ............................................. B63H 11/10
[52] U.S. Cl. ............................................ 239/265.15
[58] Field of Search ..................... 239/265.11, 265.15, 239/265.19

[56] References Cited

U.S. PATENT DOCUMENTS

| | | | |
|---|---|---|---|
| 3,237,402 | 3/1966 | Steverding | 239/265.15 X |
| 3,855,789 | 12/1974 | Platzek | 239/265.19 X |
| 4,022,129 | 5/1977 | Day et al. | 239/265.19 X |
| 4,109,867 | 8/1978 | Ebeling, Jr. | 239/265.15 |
| 4,434,614 | 3/1984 | Gill et al. | 239/265.19 X |
| 5,490,629 | 2/1996 | Bonniot et al. | 239/265.19 X |

*Primary Examiner*—Andres Kashnikow
*Assistant Examiner*—Robin O. Evans
*Attorney, Agent, or Firm*—Henry P. Sartorio; L. E. Carnahan

[57] ABSTRACT

An insert which allows a supersonic nozzle of a rocket propulsion system to operate at two or more different nozzle area ratios. This provides an improved vehicle flight performance or increased payload. The insert has significant advantages over existing devices for increasing nozzle area ratios. The insert is temporarily fastened by a simple retaining mechanism to the aft end of the diverging segment of the nozzle and provides for a multi-step variation of nozzle area ratio. When mounted in place, the insert provides the nozzle with a low nozzle area ratio. During flight, the retaining mechanism is released and the insert ejected thereby providing a high nozzle area ratio in the diverging nozzle segment.

16 Claims, 3 Drawing Sheets

STEPPED NOZZLE

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to supersonic nozzles, particularly to supersonic nozzles utilizing variable area ratios, and more particularly to an insert for supersonic nozzles which enables operation at two or more different nozzle area ratios.

It has long been known that the performance of a supersonic, gas-expanding nozzle can be increased, if the pressure ratio across the nozzle is increased and at the same time the nozzle exit area ratio (nozzle exit area divided by the nozzle throat area) is increased. The pressure ratio of a supersonic converging-diverging nozzle is the ratio of the nozzle gas inlet pressure ahead of the converging section and the nozzle exhaust pressure at the exit plane of the diverging section of the nozzle. This pressure ratio can be increased by raising the gas flow inlet pressure or by reducing the exit pressure; the latter can be accomplished by reducing the ambient or atmospheric pressure and also by simultaneously increasing the nozzle exit ratio.

The increase in nozzle performance can be expressed by the increase in nozzle exit or exhaust velocity or by the increase in specific impulse, a parameter used in rocket propulsion. Supersonic nozzles, such as utilized in rocket propulsion, and the general behavior of these supersonic nozzles, are well known and described in several text books, such as Rocket Propulsion Elements, 6th edition, chapter 3, published by J. Wiley and Sons, 1992.

Most of the rocket nozzles have a fixed area ratio; for a given inlet pressure, the exit gas pressure can be calculated or measured and it stays constant. When a rocket propelled vehicle ascends from the ground to altitude, the local atmospheric air pressure decreases with altitude. In the vacuum of space the ambient pressure is essentially zero and the gas emerging from the nozzle exit will expand further but outside of the nozzle. This gas expansion which is external to the nozzle does not contribute flight energy to the vehicle, any thus is undesirable. For a rocket propulsion system operating mostly at high altitude (above about 10 miles), a larger nozzle area ratio can be used to expand the gas on the inside of the nozzle to a relatively low exit pressure; this gives an increase in performance. At low altitude (below about 10 miles), a relatively small nozzle area ratio is appropriate (because of the relatively high value of the ambient or sea level pressure, typically 0.2 to 1.0 atm.) and the performance will be 10-26% less than a large nozzle operating at very high altitude. The specific value of this performance change with altitude will depend on the nozzle geometry, the altitude-time profile, and the properties and composition of the exhaust gas.

A rocket nozzle is said to be under-expanded if the internal gas pressure at the nozzle exit is higher than the local atmospheric or external pressure. The expansion of gas inside the nozzle is not complete and further gas expansion occurs outside the nozzle. The nozzle area ratio is too small and the performance is not at maximum.

A nozzle is said to be over-expanded if the nozzle internal pressure at the nozzle exit is lower than the external atmospheric pressure; the gas has to be recompressed in order to flow out into the atmosphere (beyond the exit of the nozzle), which is at a somewhat higher pressure. This recompression can occur smoothly if the nozzle exit pressure is only slightly higher than the ambient pressure, typically when the exit pressure is not less than approximately 40% of the ambient or atmospheric local pressure. If this pressure difference is higher, then the flow will separate from the diverging nozzle wall and the exhaust gas flow area will be smaller than the exit area of the diverging section of the nozzle. This recompression of the supersonic flow in the diverging section of the nozzle occurs by shock waves inside the diverging section. Recompression is not an efficient process and the performance will not be at its maximum. The steady state condition of the separated flow is symmetrical, that is the axis of the separated flow jet coincides with the nozzle geometric center line.

During transient operation (e.g. start up or stop) of a rocket propulsion system with an over-expanded nozzle, the flow separation is not always symmetrical and the exhaust jet can adhere more to one side of the nozzle exit cone, rather than along the nozzle axis, or in some cases the jet direction can fluctuate or oscillate. This side flow can cause momentary or oscillating asymmetrical shock wave patterns, some performance losses (1-10% of exhaust velocity), and very large side forces on the nozzle exit cone walls. In low altitude tests of several experimental rocket propulsion systems with over-expanded nozzles, these transient forces have caused dramatic failures of the thrust support structure, or the thrust vector control system actuators, or even the nozzle wall itself. Such a nozzle failure usually causes a failure of the flight mission. Because of these effects, nozzle designers have avoided operating a nozzle with a large area ratio at relatively low pressure ratios as occurs at sea level or low altitude conditions.

For the above reasons, nozzle designers have developed several variable area ratio nozzles, which allow the nozzle to have a low area ratio at low pressure ratios (or while operating at sea level or at low altitudes) and the nozzle is provided with a mechanism that changes it to a high area ratio nozzle, which is more efficient at higher pressure ratios (or at higher altitudes). For example, one variable area ratio nozzle utilizes an extendible nozzle exit cone segment which is initially not connected to the low area ratio nozzle exit cone and stored in a launch vehicle in the retracted position. When mechanically attached to the nozzle stump, the nozzle is then extended to its full area ratio and is ready for firing at higher altitudes. Such a nozzle arrangement was designed to save vehicle space and mass and can be operated at low area ratio, but the deployment of the extra nozzle segment can usually only be done when the rocket motor is not firing. Other variable area ratio nozzle approaches include a folded nozzle concept which utilizes a thin, flexible metal membrane extension secured to the diverging nozzle section, which is initially folded into a star-shaped configuration, for example, and then extended or expanded to a full circular configuration. However, such approaches have been found to be structurally unstable. Most of the variable area ratio nozzle approaches allow for a 1 or 2 step increase in nozzle area ratio, but some have allowed for a continuously increasing nozzle exit area. A number of this variable area ratio nozzles have been tested extensively on the ground and several have flown successfully. However, all of these prior variable area ratio nozzles have some or all of the following disadvantages:

1. Generally they have been heavy and require extra hardware for the nozzle extension mechanism, whereby the area ratio is increased. Any additional inert mass in the vehicle or the rocket propulsion system causes a flight performance decrease.

2. All require some form of actuation mechanism (e.g. electric motor driven lead screws, gas driven pistons, hydraulic actuators, etc.) and a separate power supply such as batteries, stored high pressure gas, a solid propellant gas generator, etc.) so as to move the nozzle components into place. This requires extra inert mass and thus decreases flight performance.

3. Most have one or more mechanical seals between adjacent parts, usually in regions of high velocity, hot gas flow. These seals have to be foolproof, because any leakage of hot gas into the vehicle or to the outside frequently leads to flight failure.

4. They are complex, consisting of several moving parts, seals, and locking mechanism, and thus may cause reliability problems and high costs.

5. All have some potential heat transfer problems requiring the use of special materials and/or special cooling provisions.

6. Most are unable to operate or deliver thrust while the nozzle area ratio is being enlarged.

Thus there is a need for a variable area ratio nozzle which is simple in construction, light weight, readily actuated, and effectively operated, thereby overcoming the above-identified problems. This is accomplished by the present invention, which utilizes a simple insert that is temporarily fastened to the aft end of the diverging section of the nozzle. The inserts of this invention provide for a two step, or three step, or more step increase of the nozzle exit area and thus give a multi-step variation of area ratio. When mounted in place, the insert provides the nozzle with a low nozzle area ratio. During ascending flight the pressure forces from the gas in the annular space above the aft closure will automatically and quickly eject the insert, thereby providing a high nozzle area ratio.

SUMMARY OF THE INVENTION

It is an object of the present invention to provide a variable area gas-expanding nozzle.

A further object of the invention is to provide a means which allows a supersonic nozzle of a rocket propulsion system to operate at two or more different effective nozzle area ratios.

A further object of the invention is to provide a nozzle with an insert whereby removal of the insert changes the nozzle area ratio.

A further object of the invention is to change nozzle area ratio without the need of auxiliary electric, hydraulic, or pneumatic power.

Another object of the invention is to provide a variable area nozzle with two or more inserts which provide for a two or more step increase of the nozzle exit area, thereby providing a multi-step variation of nozzle area ratio.

Another object of the invention is to provide a nozzle with a simple insert temporarily fastened to the aft end of the diverging section of the nozzle, whereupon release of the fastening mechanism, a controlled gas leakage, allows the gas pressure (in the annular space between the insert and the walls of the diverging section of the nozzle) to be high enough for quickly ejecting the insert when the insert release mechanism is commanded to activate, whereby the nozzle changes from a low nozzle area ratio to a higher nozzle area ratio.

Another object of the invention is to provide a removable insert in a converging-diverging nozzle for changing the nozzle from a low area ratio to a higher area ratio.

Another object of the invention is to enable the ejection of an insert at the proper time by using controlled pressure made available in the nozzle diverging cone section and to accomplish this ejection without the need of a separate power supply.

Other objects and advantages of the present invention will become apparent from the following description and accompanying drawings. The present invention involves a variable area ratio nozzle utilizing a simple hollow, annular insert that is temporarily fastened to the aft end of the diverging section of the nozzle by a ring means. When mounted in place, the insert provides the nozzle with a low nozzle area ratio. Upon release of a retaining mechanism the insert is automatically ejected from the nozzle by forces from a controlled pressure by means of restrictions to a small flow of exhaust gas through the annular space around the nozzle wall. This ejection then provides a higher nozzle area ratio. The insert or inserts may be constructed to provide for a two step, or a three step, or more step increase of the nozzles exit area and thus gives a multi-step variation of area ratio. The insert includes a slightly conical or curved top contour to allow for some expansion and acceleration of the supersonic flowing gas. A very small part of the gas is allowed to leak (flow) into the annular space between the insert and the diverging nozzle wall. This leakage occurs because there is no seal between the top of the insert and the nozzle wall with which it is in contact. The pressure in this annular space is controlled by orifices in the annular closure or support plate at the bottom of the insert. The pressure forces from the trapped gas enable quick ejection of the insert from the nozzle once the release mechanism has been activated. The insert is axially symmetric, hollow, has an inner flow-containing surface of a body of revolution, and forms an alternate diverging segment for the nozzle contour.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
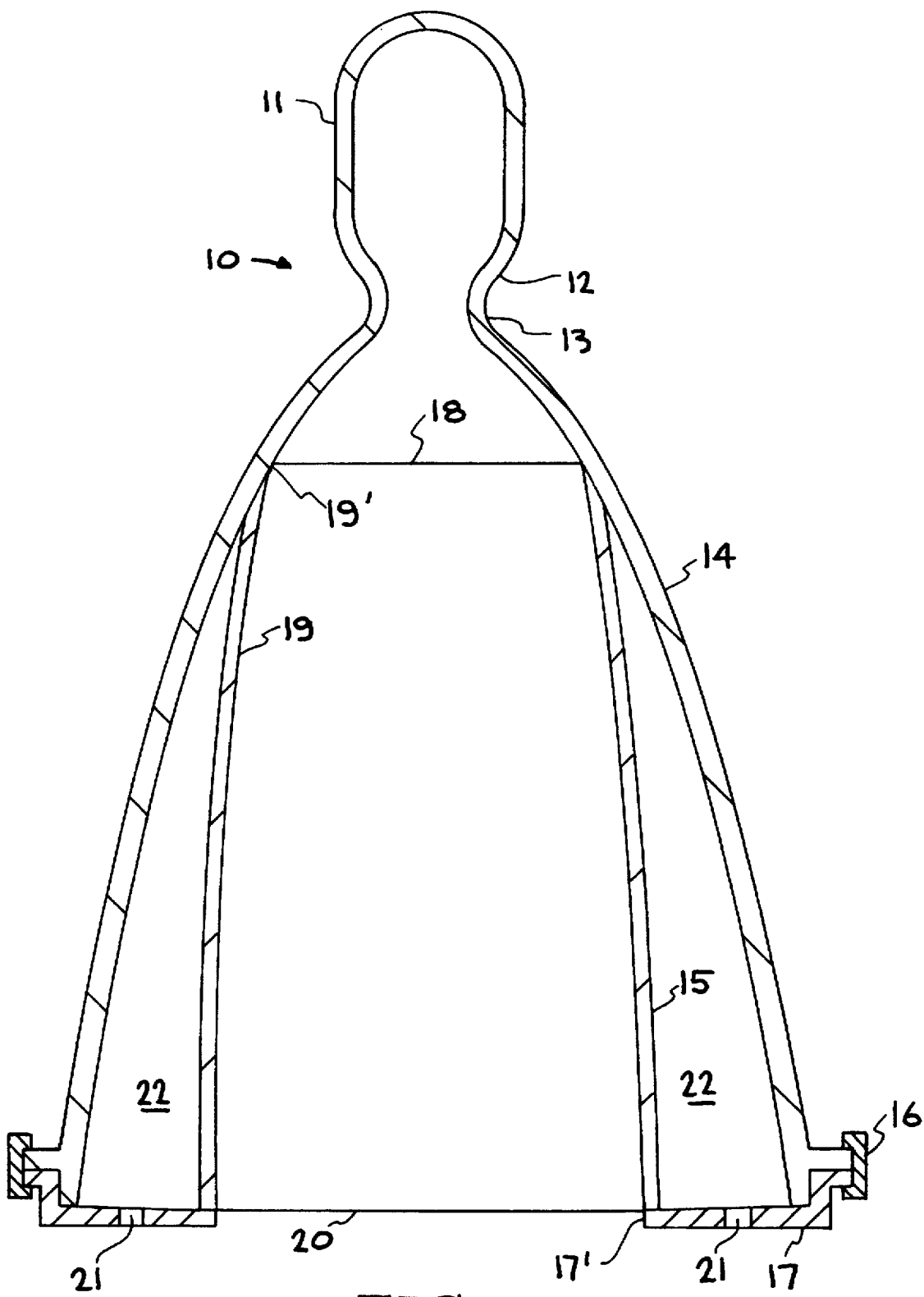
FIG. 1 illustrates an embodiment of the invention wherein an insert is retained in the nozzle by a doughnut-shaped closure.

The present invention involves one or more hollow, annular inserts that are temporarily fastened to the aft end of the diverging section of a nozzle and which provide a two step, three step, or more step increase of the nozzle exit area, thus providing a multi-step variation of area ratio. Each insert is retained in the diverging section of nozzle by one of several possible simple quick release mechanisms. A ring means comprising a clamping ring with conical contact surfaces on the nozzle exit and the insert support plate is one way to hold and seal the insert; the release being accomplished by electrically activating explosive bolts, which hold the clamping ring together. Other methods for holding and releasing the inserts may be used. Once the release mechanism is activated (e.g. by a signal from a guidance system), then the insert is quickly ejected from the nozzle by pressure forces from the gas above the insert. The removal of the insert increases the nozzle area ratio. In one embodiment, three inserts are utilized to produce a four step nozzle. In one embodiment, the inserts are retained in the nozzle by doughnut-shaped wedged retainers or support members and may be released via explosive bolts and/or spring loaded split rings. The part of the insert in contact with the gas flow is in fact a smaller nozzle diverging action; it is a surface of revolution with the smallest diameter at the top or at the point of contact with the nozzle diverging section and the largest diameter at the bottom. This contoured nozzle insert is held in place by an open, flat, ring-shaped aft closure, such as a doughnut-shaped or diaphragm member, which supports the contoured segment of the insert. There are a number of holes in this aft closure. These holes allow gas flow therethrough, as shown in the FIG. 1 embodiment and the amount of flow through the holes controls the gas pressure above the closure. The support plate is fastened temporarily, for example, to the exit edge of the high area ratio nozzle as illustrated in FIG. 2.

When mounted in place, the hollow, annular insert provides the nozzle with a different diverging (supersonic flow) section and thus low nozzle area ratio. During ascending flight, when the ambient air pressure decreases and there is excessive gas expansion outside of the insert exit, then the fastening or retaining mechanism is commanded to be released and the pressure forces from the gas above the aft closure will automatically and quickly eject the insert.

It is thus seen that the insert consists of three (3) functional parts connected together, these being: (1) a segment of the diverging section of the nozzle—it confines the supersonic gas flow, (2) a ring assembly (which becomes a part of the fastener) and is temporarily attached to the outermost (permanent) largest diverging section of the nozzle, and (3) a structure to connect elements (1) and (2)—one way being an annular support plate. The assembly may have structural stiffening ribs or other means for stiffening and also provisions to prevent cocking or binding (e.g. guide ribs) of the insert, while it is being ejected.

Figure 2:
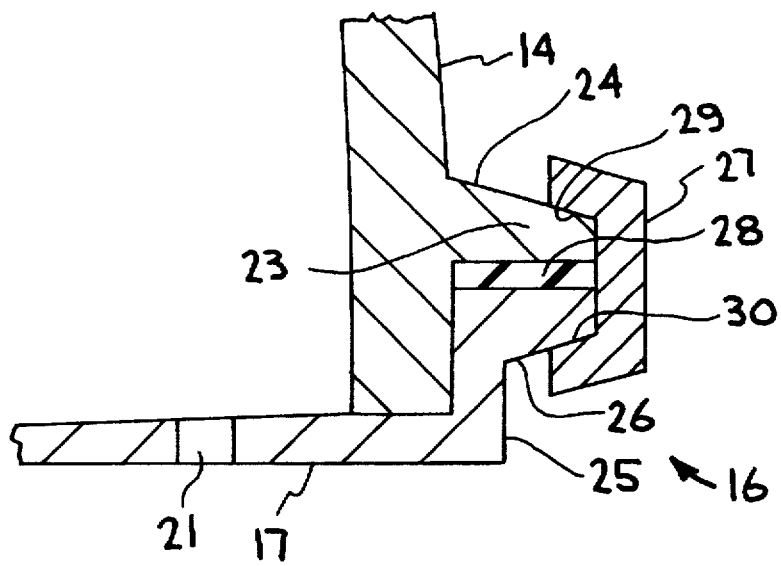
FIG. 2 is an enlarged exploded view of an embodiment of a section of the insert attachment/release mechanism of FIG. 1.

As seen in FIG. 1, the top end or tip of the insert fits snugly against the wall of the permanent high area ratio nozzle, but it does not need to provide for a gas tight seal; on the contrary a small leakage of hot gas is allowed. The diaphragm, support plate, or aft closure has small holes that allow for the controlled escape of a small flow of gas that leaks past the annular area of the snug fit between the insert and the outer diverging nozzle wall. Since the gas flow and its velocity are low in the annular space around the insert, the heat flow to the part of the diverging section of the nozzle (area surrounding the insert) is low, thus causing little heating to the nozzle exit wall.

Figure 3:
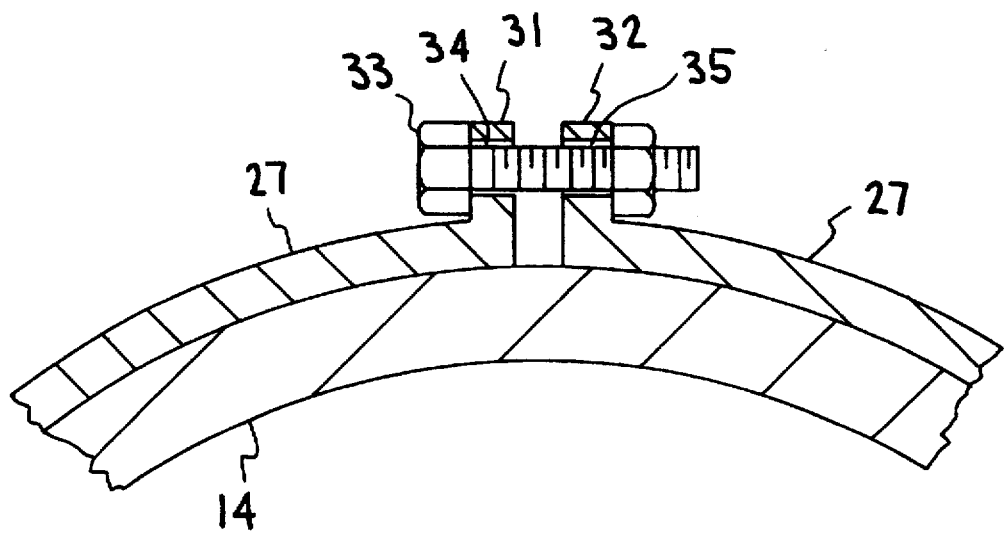
FIG. 3 is an enlarged cross-sectional view of another section of the insert attachment/release mechanism utilizing two or more explosive bolts.

Any one of several different fastening mechanisms or attachment/release devices can be used. One example, see FIG. 2, is a spring loaded split ring means held temporarily together with a quick release mechanism such as explosive bolts as shown in FIG. 3. The split ring is broken, on command, in two or more places and that releases the insert. A gas seal, such as a gasket or O-ring is included to prevent escape of the gas through the fastening device. An alternative fastening device is a simple flange with a sealing gasket and multiple bolts that are explosively removed. Explosive bolts are highly reliable, commercially available fasteners. Because the gas forces cause the ejection of the insert, there is no need for a separate actuator or power supply for removing same.

The lip or flange to which the insert is fastened at the lower end thereof, carries the loads into the nozzle exit skirt. The lip is external of the nozzle, located on the outside of the nozzle wall and at the aft end of the nozzle; thus the fastening mechanism and gas seal are therefore not exposed to hot high velocity, high temperature gases. A small flow of hot gas passes slowly through a contoured passage between the nozzle wall and the insert. The fastener devices thus do not need to be made of special heat resistant materials and are so designed that the explosive bolts are not subjected to enough stray heat to cause them to be inadvertently activated.

Referring now to FIGS. 1–3, a nozzle, generally indicated at 10, is connected to a reaction or combustion chamber 11 via a sub-sonic converging section 12 of the nozzle 10, and may be integral with the chamber 11 or connected thereto. Nozzle 10 also includes a throat (sonic velocity) section 13 and a diverging (supersonic) section or exit cone 14 which is provided with a hollow, downwardly and outwardly tapering insert 15 retained therein by a retaining/release or fastening mechanism or device generally indicated at 16 via a diaphragm, ring-shaped or doughnut-shaped support plate or member 17. An upper end or tip 18 of insert 15 is provided with a slight contoured or curved surface 19 having a tapered edge 19' which fits snugly against an inner wall of diverging section 14 of nozzle 10. Note that the upper end 18 of insert 15 is of a smaller diameter than a lower end 20 of the insert. The lower end 20 of insert 15 is in contact with and secured in section 14 of nozzle 10 by a diaphragm or doughnut-shaped support member or plate 17 having an opening 17'. Insert 15 may be secured to plate 17 by welding, or by forming components 15 and 17 as a single integral part, and plate or member 17 is provided with a plurality of vent holes 21 (only two shown) through which a small, predetermined, controlled flow of gas passes from an annular space 22 between insert 15 and the inner wall of diverging section 14, as described above. Plate 17 may abutt against end 20 of insert 15 so as to retain edge 19' in a smooth flow contact with inner wall surface of nozzle section 14.

One embodiment of the fastening or retaining/release mechanism or device 16 is enlarged and shown slightly exploded in FIG. 2. A lower end of diverging nozzle section 14 is provided with an annular lip or protruding section 23 (which has a conical contact or wedge surface 24), with the plate or diaphragm 17 having a peripheral edge in the form of a ring 25 with a conical contact or wedge surface 26, and a ring means comprising a spring loaded split ring 27 is positioned over surface 24 of lip 23 and surface 26 of ring 25 for retaining same together and clamping a sealing gasket 28 whereby there is no gas leakage there between. Split ring 27 includes conical contact surfaces or sections 29 and 30 to engage conical contact surfaces 24 and 26 and is composed of three or more sections, only two shown in FIG. 3, interconnected by quick release mechanisms, such as explosive bolts, similar to the bolt shown in FIG. 3. When the explosive bolts are tightened, the conical contact surfaces will cause the sealing gasket to be clamped very tightly. Split rings and explosive bolts are well known in the art and further description thereof is deemed unnecessary.

In operation of the FIGS. 1-2 embodiment, once the nozzle has reached a desired altitude, for example, by electronic command (from a timer, a flight vehicle control system, etc.) the explosive bolts of fastener device 16 may be activated and the sections forming the split ring 27 separate, whereby pressure forces of the gas in the annular space 22 act on the support member or plate 17 forcing the downward movement and ejection of insert 15 and diaphragm or support plate 17 from the diverging section or exit cone 14 of nozzle 10. Once the released insert has started its downward movement, the impact of the main gas flow on the upper edge 19' will cause a quick discharge or removal of the insert from the diverging section 14 of the nozzle, and thus the insert may be considered as being self-ejected.

FIG. 3 illustrates another view in cross-section of the fastening mechanism 16 of FIG. 2, which comprises a pair of flanged wedging clamp sections 31 and 32 of split ring sections 27, and which are secured together by a quick release mechanism, such as two or more explosive bolts 33, only one shown. Note that the holes 34 and 35 in clamp sections 31 and 32 are larger than the outer diameter of bolts 33, which permits some misalignment and thermal deformation. Upon reaching a desired altitude, for example, the explosive bolts 33 are activated allowing the sections of split ring 27 to separate, whereby the gas pressure forces acting on the support plate or member 17 of insert 15 forces the insert downwardly causing its ejection from the exit cone or diverging nozzle section 14, thereby changing the low nozzle area ratio (via insert 15) to a high nozzle area ratio (insert 15 removed).

By way of example, the insert 15 may be constructed of heat resistant materials such as molybdenum, tantalum, tungsten, rhenium, iridium, or woven carbon fibers in a carbon matrix; the support member or plate 17 and gasket or seal 28 may be constructed of these same materials or in some cases of less heat resistant materials, such as stainless steel or alloy steels; and the split ring 27 and the clamp sections 31 and 32 may be constructed of less temperature resistant materials including steels or titanium. Coatings to protect refractory material from oxidation by the hot gases may be deposited on the insert 15.

Figure 4:
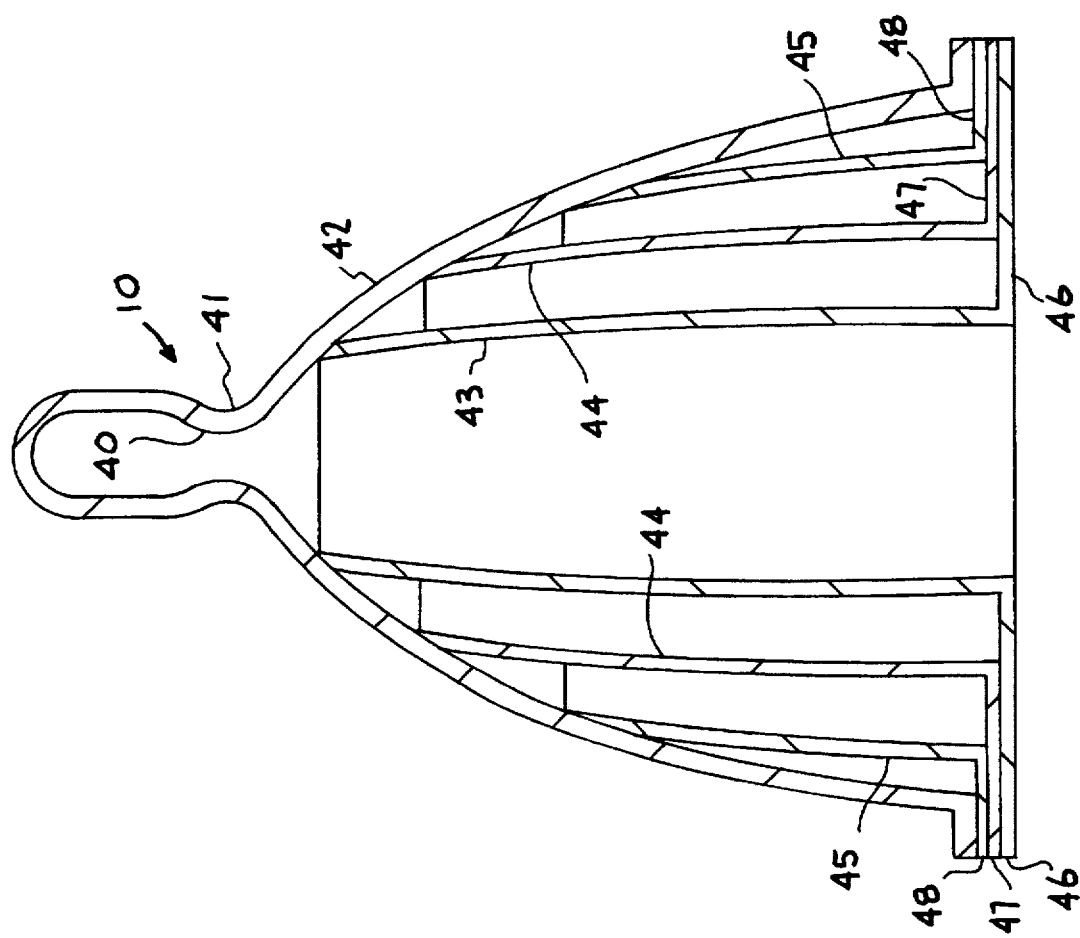
FIG. 4 schematically illustrates an embodiment of the invention utilizing three inserts retained in the nozzle as in FIG. 1.

For many flight applications a two step nozzle with a single insert and two different area ratios, as shown in FIG. 1. is quite adequate. However, for some high flight performance applications a three or four step nozzle may be more effective. Here the performance increase due to a higher average area ratio outweighs the performance decrease due to higher inert mass. FIG. 4 schematically illustrates an embodiment utilizing a four step nozzle with three inserts. As shown in FIG. 4, a nozzle, similar to nozzle 10 of FIG. 1, includes a converging section 40, a throat section 41, and a diverging section 42 within which three coaxial concentric hollow inserts 43, 44, and 45 are retained by respective fastener devices, such as device 14 of FIG. 1. Each of inserts 43, 44, and 45 are connected to a fastening device via respective diaphragms or doughnut-shaped support members or plates 46, 47, and 48. At selected altitudes, for example, each of the fastening mechanisms (not shown) for inserts 43, 44, and 45 are released, whereby gas pressure above the respective support members or plate and gas pressure on upper edges of the inserts causes ejection of that insert from the divergent nozzle section 42, thereby increasing the nozzle area ratio. As in the FIG. 1 embodiment, the inserts 43, 44, and 45 may be considered as being self-ejected due to the pressure on the upper edges thereof.

A critical location of the nozzle insert is at the circular tip thereof, where it touches the wall of the diverging section of the large area ratio nozzle. It is intentionally located in a region well downstream of the throat section of the nozzle. Here the gas temperature, wall temperatures, and the local heat transfer are considerably lower than at the throat region.

It is possible for the boundary layer of the gas to come close to stagnation conditions at the groove formed by the contact of the insert tip and the nozzle wall. This stagnation temperature is high enough (5000° F. or more) to melt, oxidize or weaken most metallic materials. Only ablative materials, carbon, and certain ceramic materials could survive full stagnation conditions and survive this environment of high temperature, very fast supersonic gas flow, and reactive hot gases. A wide groove with a sharp edge will produce stagnation conditions similar to the ones in a reentry nose cone of a ballistic missile. Thus, substantial efforts have been made to alleviate this condition.

Figure 5:
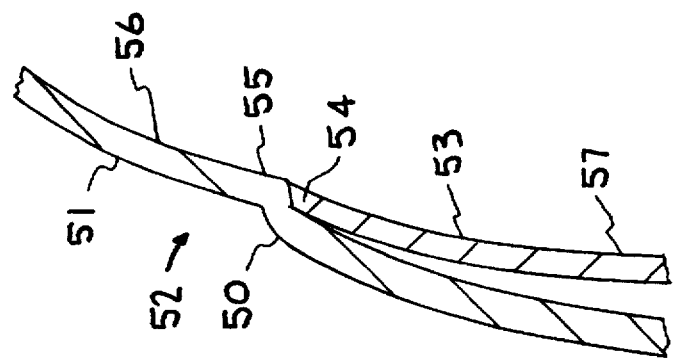
FIG. 5 is a partial illustration of another embodiment wherein an upper end of the insert is located in a hump in the nozzle wall, thereby preventing full stagnation conditions at the insert tip/divergent wall intersection.

A particular feature of a preferred embodiment of this invention is that it prevents full stagnation conditions to be reached by slight alternations in the contour of the nozzle wall and the insert tip. This preferred approach is illustrated in FIG. 5. As seen in FIG. 5, a bulge or hump 50 is formed in a wall section 51 of a divergent section 52 of the nozzle. An insert 53 having a curved upper end or tip 54 is positioned downstream of a point 55 of bulge or hump 50, whereby a substantially continuous surface is formed along an inner wall 56 of divergent section 52 and an inner wall 57 of insert 53. The local bulge or hump in the nozzle wall (which can be cooled, if liquid propellant is used, or made of ablative materials, if solid propellants are used) will cause the local temperature to be well below the stagnation condition. These materials will survive the hostile environment. It may be possible for the high temperature metals (tantalum, rhenium, tungsten, molybdenum), to also survive, provided they have an oxidation resistant coating on the inside surfaces of the insert.

After the insert is released and discarded, the nozzle will flow full at the higher area ratios and flow will not separate. The small bulge or hump will not cause a local flow separation or a significant performance loss, because it will still be in a region of relatively high axial pressure gradient. This means that the design of the divergent wall contour will cause local expansion and compression shock waves to cancel each other; this will allow the nozzle flow to adhere to the nozzle wall.

Another alternate method for avoiding stagnation temperatures at the joint between the wall and the tip of the insert is to use a small amount of film cooling flow in applications where liquid propellants are available. This film cooling flow is small, is injected through a series of small holes in the nozzle diverging section just upstream of the insert/wall joint. However, film cooling will cause a slight loss of specific impulse.

The potential wedging of the tip of the insert into the nozzle wall can be prevented by proper design features. As the insert is heated by hot gases, the insert will grow in diameter, while the nozzle wall (which may be cooled or constructed of slowly heating ablative) will not get as hot and will not expand as much as the insert tip; this leads to a wedging or locking of the insert, which can prevent its ejection. There are several design concepts for preventing the insert to "stick" or be wedged against the nozzle divergent section wall. One way is to cut longitudinal short slots into the tip of the insert. Another method is to build weak sections into the insert that will yield under compressive stress. An alternative is to design the vent holes in the base of the aft closure to be sufficiently small, so that the pressure separation forces are large enough to overcome the sticking forces.

The length of the insert will grow as its material expands with heating. A flexibility designed into the aft closure or support member or plate will allow the cylindrical insert to grow in length without causing it to grow into the tight fit at the top and accentuate the wedging effect.

The benefit that any variable or stepped area ratio nozzle has, depends on the application, the specific design, the flight path, the method for preventing excessive heating and other factors. It applies both to liquid propellant rocket engines and solid propellant rocket motors. Good applications are in space launch vehicles, defensive missiles, or ballistic missiles. This includes commercial launch vehicles. For some of these applications the improvement in propulsion performance (due to higher exhaust velocity or higher specific impulse) can be a significant increase in payload, range, or useful mass in orbit. For some applications, such as a single stage to orbit launch vehicle, it can provide a sufficient margin so as to make the mission feasible or possible. It is particularly effective in flying vehicles with multiple parallel thrust chambers. One advantage of the insert arrangement of this invention: thrust can be delivered to the vehicle while the nozzle area ratio is being changed.

It has thus been shown that the present invention provides a stepped or variable area ratio nozzle which allows a significant improvement in vehicle or mission performance and inert mass reduction; is a relatively simple device with only one moving part, namely the insert that is ejected by gas pressure and thus enhances its reliability and reduces inert mass; does not require a separate actuator and/or a separate or enlarged power supply; leaks are less likely and some leakage is desirable to pressurize the annular area between the insert and the nozzle wall; seals are externally in low pressure and low temperature locations; the bump in the nozzle wall prevents exposure of materials to very high temperatures making it possible to use lower cost materials; and permits a relatively rigid structure with relatively less mass of inert material.

While specific embodiments, materials, etc., have been illustrated and/or described to exemplify and explain the invention, such are not intended to be limiting. Modifications and changes may become apparent to those skilled in the art, and it is intended that the invention be limited only by the scope of the appended claims.

The invention claimed is:

1. A stepped nozzle including:

a nozzle body including a converging section, a throat section, and a diverging section, at least one hollow member removably located in said diverging section of said nozzle body, and means for retaining/releasing said hollow member, said means for retaining/releasing said hollow member including a support member having a plurality of vent holes therein, said support member being secured to an aft end of said hollow member and releasably secured to an aft end section of said diverging section of said nozzle body.

2. The stepped nozzle of claim 1, wherein said at least one hollow member comprises a partially self-ejectable insert including a curved end section in contact with an inner wall surface of said diverging section of said nozzle body.

3. The stepped nozzle of claim 1, wherein said at least one hollow member comprises a plurality of coaxial hollow inserts, each of said hollow inserts being provided with means for retaining/releasing same from within said diverging section of said nozzle body.

4. The stepped nozzle of claim 1, wherein said retaining/releasing means additionally includes at least one ring means positioned around an external section of said diverging section of said nozzle body, said support member being adapted to be retained and released by said at least one ring means.

5. The stepped nozzle of claim 4, additionally including a seal means positioned intermediate said support member and said diverging section of said nozzle.

6. The stepped nozzle of claim 4, wherein said at least one ring means comprises a spring loaded split ring, and additionally including means for releasing said split ring.

7. The stepped nozzle of claim 6, wherein said split ring means includes a pair of flanged sections interconnected by a quick release mechanism.

8. The stepped nozzle of claim 7, wherein said quick release mechanism includes a plurality of explosive bolts.

9. The stepped nozzle of claim 1, wherein said diverging section of said nozzle body includes a wall section having a bulge therein, and wherein said hollow member is positioned to contact said wall section adjacent to said bulge, whereby a substantially continuous surface is provided by an inner surface of said wall section and an inner surface of said hollow member.

10. In a supersonic nozzle having a converging section, a throat section, and a diverging section, the improvement comprising:

means for varying the nozzle diverging section from a low nozzle area ratio to a high nozzle area ratio, said means including at least one hollow insert positioned in said diverging section, means for retaining said at least one hollow insert within said diverging section, and means for allowing said at least one hollow insert to be ejected from said diverging section, said retaining means including a support member having a plurality of vent holes therein, said retaining means being secured to an aft end of said hollow insert and removably connected to said means for allowing said hollow insert to be ejected.

11. The improvement of claim 10, wherein said at least one hollow insert is composed of a plurality of concentric hollow inserts, each concentric hollow insert being provided with separate retaining means and separate means for allowing ejection thereof from said diverging section.

12. The improvement of claim 10, wherein said at least one hollow insert is provided at one end with a surface adapted to contact an inner wall surface of said diverging section, and is at least partially self-ejectable.

13. The improvement of claim 12, wherein said inner wall surface of said diverging section includes a bulge, said one end of said hollow insert contacting said inner wall surface adjacent said bulge, whereby a substantially smooth surface is formed from said inner wall surface of said diverging section to an inner surface of said hollow insert.

14. The improvement of claim 12, wherein said surface of said one end of said hollow insert is contoured.

15. The improvement of claim 10, wherein said means for allowing said hollow insert to be ejected includes a ring assembly operatively connected to said support member, and quick release means operatively connected to said ring assembly.

16. The improvement of claim 15, wherein said quick release means includes at least two explosive bolts.

* * * * *